(12) United States Patent
Sabo et al.

(10) Patent No.: US 10,337,627 B2
(45) Date of Patent: Jul. 2, 2019

(54) COMPOSITE SANDWICH PANELS FOR OILFIELD VALVE

(71) Applicant: WEATHERFORD TECHNOLOGY HOLDINGS, LLC, Houston, TX (US)

(72) Inventors: Stosch Sabo, Mason City, IA (US); Matthew Stage, Richfield, MN (US)

(73) Assignee: Weatherford Technology Holdings, LLC, Houston, TX (US)

( * ) Notice: Subject to any disclaimer, the term of this patent is extended or adjusted under 35 U.S.C. 154(b) by 19 days.

(21) Appl. No.: 15/321,356

(22) PCT Filed: Sep. 4, 2015

(86) PCT No.: PCT/US2015/048486
§ 371 (c)(1),
(2) Date: Dec. 22, 2016

(87) PCT Pub. No.: WO2016/037031
PCT Pub. Date: Mar. 10, 2016

(65) Prior Publication Data
US 2017/0211712 A1    Jul. 27, 2017

Related U.S. Application Data

(60) Provisional application No. 62/046,291, filed on Sep. 5, 2014.

(51) Int. Cl.
*F16K 15/03* (2006.01)
*B23P 15/00* (2006.01)
(52) U.S. Cl.
CPC ............ *F16K 15/03* (2013.01); *B23P 15/002* (2013.01)

(58) Field of Classification Search
CPC .................................. F16K 15/03; B23P 15/002
USPC .................................................. 137/527–527.8
See application file for complete search history.

(56) References Cited

U.S. PATENT DOCUMENTS

| | | | | |
|---|---|---|---|---|
| 3,809,119 A * | 5/1974 | Cave | ................. | F16K 15/031 137/527.6 |
| 4,469,122 A | 9/1984 | Meek | | |
| 4,781,212 A * | 11/1988 | Scaramucci | ........... | F16K 15/03 137/515.7 |
| 5,775,357 A * | 7/1998 | Regna | .............. | B60K 15/03519 137/43 |
| 5,899,218 A * | 5/1999 | Dugan | .................. | F15C 5/00 137/1 |
| 2013/0196175 A1 | 8/2013 | Levit et al. | | |

(Continued)

FOREIGN PATENT DOCUMENTS

JP        2013059950 A        4/2013

OTHER PUBLICATIONS

EPO Translation of JP2013059950 Published on Apr. 4, 2013.*
International Search Report with Written Opinion dated Jan. 22, 2016 for PCT Patent Application No. PCT/US15/048486, 12 pages.

*Primary Examiner* — P. Macade Nichols
(74) *Attorney, Agent, or Firm* — Smith IP Services, P.C.

(57) ABSTRACT

An oilfield valve having a body defining a throughbore and configured for controlling flow through the throughbore, wherein the valve has a disc connected to the body and movable between an open position and a closed position, and further wherein the disc has a top surface and a bottom surface, and defines a perimeter, wherein the disc is composed of a composite material having a facesheet and a core material adhered to the facesheet.

26 Claims, 3 Drawing Sheets

(56) References Cited

U.S. PATENT DOCUMENTS

2014/0261789 A1* 9/2014 Hull .................. F16K 15/03
  137/527.8
2016/0010756 A1* 1/2016 Fallon ................ F16K 15/03
  137/12

* cited by examiner

COMPOSITE SANDWICH PANELS FOR OILFIELD VALVE

CROSS-REFERENCE TO RELATED APPLICATIONS

This application is a national stage under 35 USC 371 of International Application No. PCT/US2015/048486, filed on 4 Sep. 2015, which claims the benefit of the filing date of U.S. Provisional Application No. 62/046,291, filed on 5 Sep. 2014. The entire disclosures of these prior applications are incorporated herein by this reference.

BACKGROUND

Technical Field

The disclosure relates to check valves for controlling flow in a wellbore or downhole environment.

Check valves and flapper valves need to be polycrystalline diamond and polycrystalline diamond compact (hereinafter, PCD and PDC, respectively) drillable while holding increasing backpressures at increasing temperatures. Conventional use of composites in check and flapper type valves result in less than predicted component performance for these requirements and may also have low pressure ratings due to residual stresses, voids, poor fiber wet-out, and machining. Both molded discontinuously reinforced composite types of check valves and infused and machined, continuously reinforced composite types of valves experience such problems. In the first case, the molded, discontinuously reinforced composite check valves may fail due to residual stresses or unacceptably large tolerances resulting from molding. In the second case, the infused and machined, continuously reinforced composite type of check valve may fail due to manufacturing defects associated with thick laminate infusion and fiber breakage associated with machining.

These current composite check valves, which are made of molded, discontinuously reinforced composite materials or resin-infused laminates which are subsequently machined, may have low pressure ratings because of various factors. One such factor is geometry—conventional geometry of molded check valves induces residual stress concentrations as a result of thick cross-sections and/or significant variation in cross-sectional thicknesses. These residual stresses are propagation sites for crack initiation and premature failure. Moreover, molded check valves require discontinuous reinforcement. Both the discontinuous nature of the reinforcement, and the challenges associated with repeatable fiber orientations during molding, lead to sub-optimal and unpredictable part performance. In addition, resin-infused laminates which are subsequently machined may fail due to: voids and/or dry spots during manufacture of the thick laminates which create propagation points for delamination; strain-induced delamination caused by backpressure which leads to delamination between fiber layers and which leads to failure; and the machining of flapper valves from a larger laminate which lowers part performance by compromising the continuous nature of the fibers and thus lowers the mechanical properties of the final component.

Thus there exists a need for a check valve that is PCD and/or PDC drillable and capable of holding increasing backpressures at increasing temperatures.

BRIEF SUMMARY

The exemplary embodiments relate to an oilfield valve having a body defining a throughbore and configured for controlling flow through the throughbore, wherein the valve has a disc connected to the body and movable between an open position and a closed position, and further wherein the disc has a top surface and a bottom surface, and defines a perimeter, wherein the disc is composed of a composite material having a facesheet and a core material adhered to the facesheet.

As used herein, the term 'disc' shall include not only circular shapes, but also shapes other than circular. As used herein, the term 'check valve' shall refer also to float valves; and flapper valves are to be understood to be a types of 'check valves'. As used herein, the terms 'continuously reinforced' and 'fiber continuity' of a structure shall mean unbroken fibers extending in one direction of, or substantially along a direction of the structure in question, in any one or more directions according to the length, width and/or height of the structure.

BRIEF DESCRIPTION OF THE FIGURES

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DETAILED DESCRIPTION OF THE EXEMPLARY EMBODIMENT(S)

The description that follows includes exemplary apparatus, methods, techniques, and instruction sequences that embody techniques of the inventive subject matter. However, it is understood that the described exemplary embodiments may be practiced without these specific details.

Figure 1:
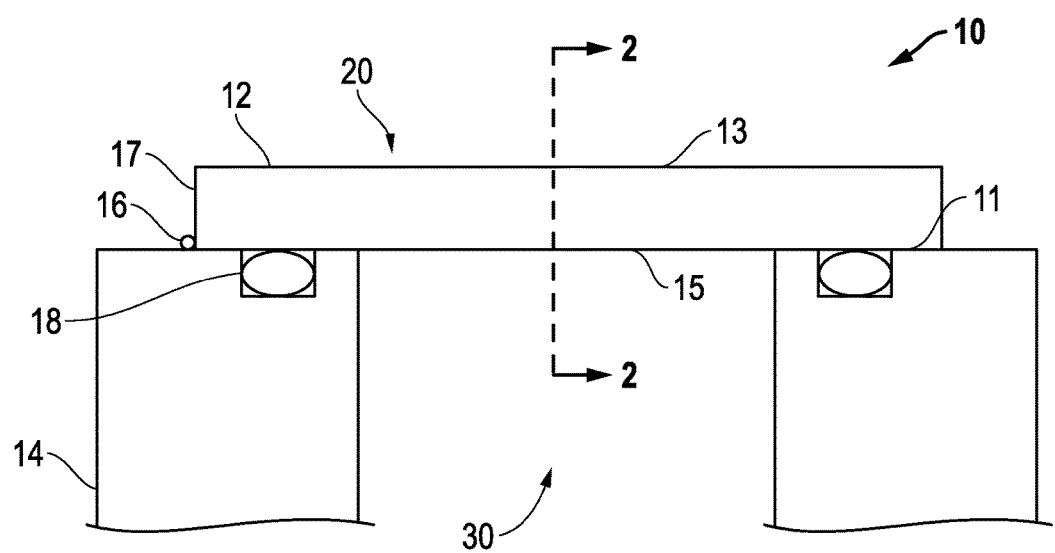
FIG. 1 depicts a schematic view of an oilfield check valve.

FIG. 1 depicts a schematic view of an oilfield check valve 10. In a preferred exemplary embodiment, the check valve 10 is for use in float equipment, however, other exemplary embodiments incorporating check valve 10 are possible, including, by way of example only, use in subsurface safety valves, sucker rod lifts, or gas lift valves. As depicted, check valve 10 is a flapper type valve having a disc 12 (e.g. a flapper) and a body 14. The body 14 may define a throughbore or flow path 30, which is obstructed by disc 12 when the disc 12 is set against a seat, seating or bearing surface 11 of the body 14 in the closed position. The surface 11 of the body 14 may be perpendicular to or at an angle acute to the throughbore 30. The disc 12 may be coupled to body 14 by a hinge 16, which allows the disc 12 to move between the closed position and an open position, which allows flow through the throughbore 30. The disc 12 has a top surface 13, a bottom or sealing surface 15, and a circumference or perimeter 17. In the exemplary embodiment depicted in FIG. 1, the check valve 10 is in a closed position and prevents flow through throughbore 30. In addition, the seating surface 11 of the body 14 may house or include an O-ring or seal elastomer 18 which may seal against the disc 12 when the check valve 10 is in the closed position. In the exemplary embodiments disclosed herein, disc 12 of check valve 10 is composed from a sandwich composite material 20. Other components of the oilfield check valve 10, by way of example only, the body 14 or the hinge 16, may optionally also be composed of sandwich composite material 20.

Figure 2:
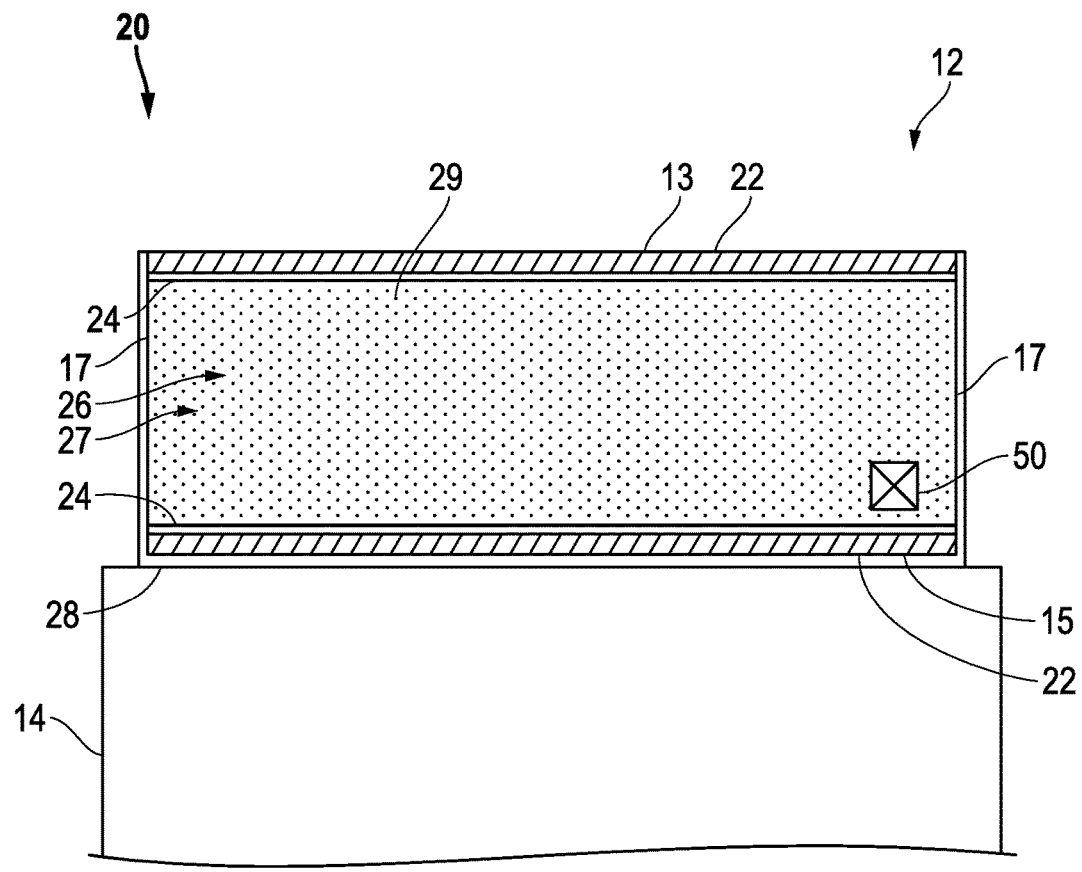
FIG. 2 depicts a cross section view of an oilfield check valve along line 2-2 of FIG. 1.

FIG. 2 depicts a cross section view of an oilfield check valve 10, particularly of the disc 12, along line 2-2 of FIG. 1. As shown, disc 12 is manufactured from a sandwich composite material or panel 20 having two continuously reinforced, laminated facesheets 22 forming each of the top surface 13 and bottom surface 15 of the disc 12, wherein the two facesheets 22 are separated by a core material 26 having different properties from the facesheet material. The potential different core properties include, but are not limited to, lightweight, compressive strength, shear strength, temperature resistance, chemical resistance, and elastic moduli. The facesheets 22, as illustrated, are flat plates, but in alternative exemplary embodiments may have a concave or convex shape. An adhesive layer 24 may be required to effectively bond or adhere the facesheets 22 to the core 26. The sealing or bottom surface 15 and circumference or perimeter 17 of the disc 12 may be covered with a coating 28 to protect the sandwich composite material 20 in the downhole environment. The coating 28 may be composed of an elastomeric, plastic, or composite material. The top surface 13 may also be covered with the elastomeric coating 28 as well. In exemplary embodiments the diameter of the circumference or perimeter 17 of the disc 12 is preferably constant from disc top surface 13 to disc bottom surface 15 as represented in FIGS. 1 & 2 (whereas in prior discs it may be decreasing in diameter from top-to-bottom, i.e. conical in profile) to increase the bearing area between the disc bottom surface 15 and the seating surface 11 of the body 14. The extra bearing area 11 can decrease peel/delamination/separation or forces acting to peel/delaminate/separate the disc and/or the body 14. The extra bearing area 11 can also decrease forces acting to separate the disc 12 and the body 14. It is to be understood however that the geometry of the disc 12 may change depending upon the application and/or the orientation of the check valve 10.

Figure 3:
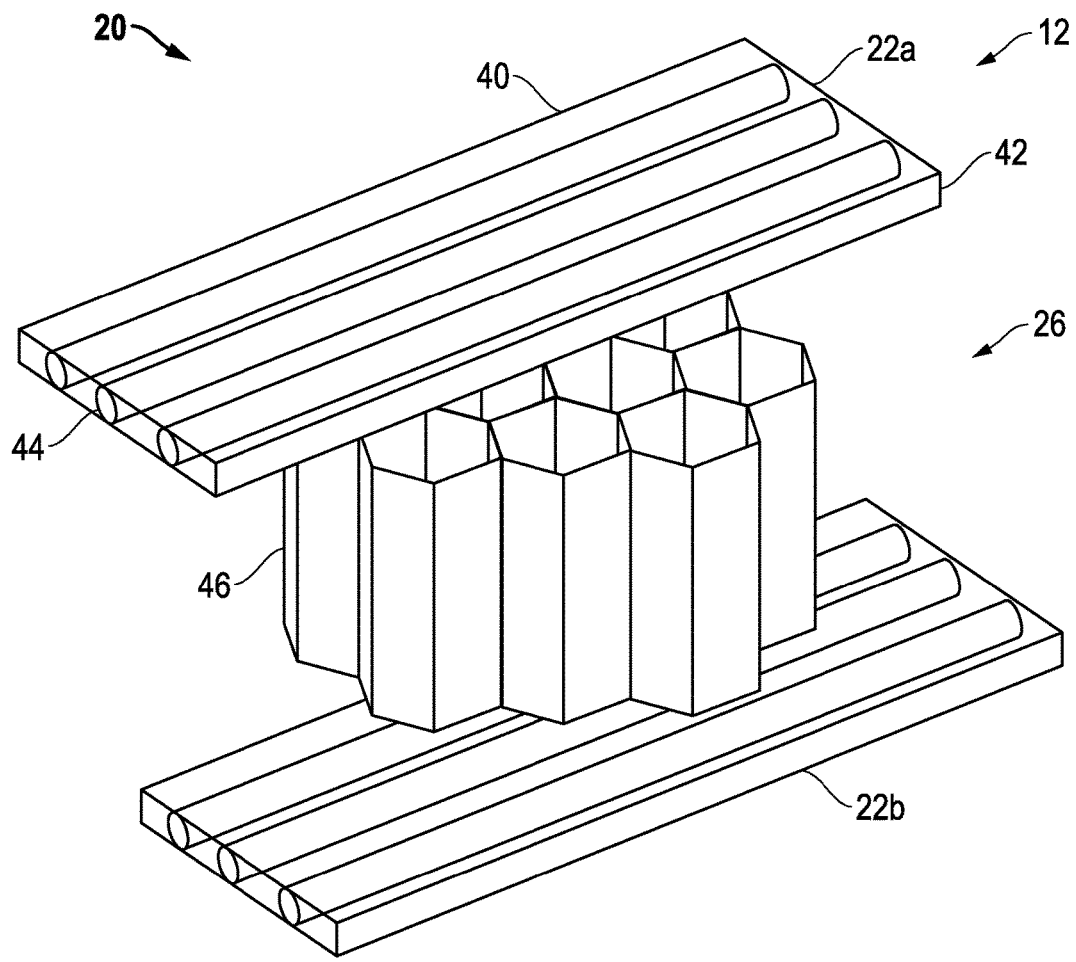
FIG. 3 depicts an exploded perspective view of an exemplary embodiment of a sandwich composite material for use in an oilfield check valve.

FIG. 3 depicts an exploded perspective view of an exemplary embodiment of a sandwich composite material 20 for use in an oilfield check valve 10. In the depicted exemplary embodiment, facesheets 22 of disc 12 are composed of high strength composite laminates 40. The facesheet 22 geometry is a flat, continuous-thickness plate, thereby minimizing residual stresses due to manufacturing while maintaining fiber continuity. The top facesheet 22a and bottom facesheet 22b may be composed of the same or different composite material laminates 40 which will each contain a matrix phase 42 and a reinforcement phase 44. Moreover, the matrix phase 42 and/or the reinforcement phase 44 between the facesheets 22a, 22b may be the same or different. The matrix material 42 may be a thermoplastic material (e.g. PEEK, PTFE, PEK, PEKK, HDPE, PEI, nylon, polypropylene, LDPE, polycarbonate, PVC, ABS etc.), or thermoset (e.g. epoxy, vinylester, polyester, phenolic, polyamide, bismaleimide, polyurethane, polyimide, cyanate ester, polyamidimide, etc.) material or polymer. The reinforcement phase 44 may be composed of ceramic, metal, carbon, aramid, or synthetic fibers or a combination of these fibers, and may be contained in a mat, fabric, unidirectional, non-crimp three-dimensional ("3D") woven, or preimpregnated sheet, fabric, or tape form. Moreover, each facesheet 22a, 22b may each be comprised of more than one layer of composite material laminate 40.

The facesheets 22 are separated by the core 26 which increases the stiffness of the sandwich composite 20. The core 26 may be a low density foam, a honeycomb shaped structure material 46, an elastomer, or a plastic. For example, the core material 26 located between the facesheets 22 may be an open-cell or closed-cell foam 27 made from polyvinylchloride, polyurethane, polyethylene, polystyrene, syntactic foams, wood, or synthetic materials such as aramids. In another alternative exemplary embodiment, the core 26 may be a molded plastic or composite constructed of a thermoplastic material (e.g. PEEK, PTFE, PEK, PEKK, HDPE, PEI, nylon, polypropylene, LDPE, polycarbonate, PVC, ABS etc.) or thermoset material (e.g. epoxy, vinylester, polyester, phenolic, polyamide, bismaleimide, polyurethane, polyimide, cyanate ester, polyamidimide, etc.) and may contain a discontinuous reinforcement in the form of fibers 29 (e.g. ceramic, metal, carbon, aramid, or synthetic fibers or a combination of these fibers, and may be contained in a mat, fabric, unidirectional, non-crimp 3D woven, or preimpregnated sheet, fabric, or tape form) or other fillers. Alternatively, in yet another exemplary embodiment as illustrated in FIG. 3, the core material 26 may have a structure, by way of example only, in the form of a honeycomb structure 46 of various geometries, made from metal, ceramic, or natural or synthetic polymer or fibers. A honeycomb core structure material 46 may include a filler material such as a foam 27, thermoplastic material, a thermoset material, or a composite containing a thermoplastic material, thermoset material, or elastomeric resin in conjunction with a fiber, filler or discontinuous reinforcement 29 made from ceramic, carbon, metal, or synthetic materials.

The structure of disc 12 acts in a similar manner to an I-Beam wherein the facesheets 22 provide tensile and compressive strength and the core 26 carries the shear load while separating the facesheets 22 to increase the stiffness of the disc 12. This increased flexural stiffness reduces the strain imposed on the facesheets 22, thereby limiting failures due to delamination and forcing tensile or compressive failure. The increased stiffness also prevents flexure which in turn advances sealing. The thinner nature of the facesheets 22 decreases manufacturing defects such as voids or poor fiber wet-out associated with thick, infused laminates. The result is a high strength structure with low density (or a relatively high stiffness to weight and high strength to weight ratio as compared to prior wellbore check valve components).

Further, the sandwich composite material or panel 20 exhibits several desirable properties for the disc 12 of check valve 10. The disclosed check valve 10 is able to achieve higher backpressure and temperature ratings than currently achievable. The disclosed check valve 10 may also be advantageous in lower pressure settings as: the sandwich composite 20 is lighter weight than conventional float valves, where the hinge 16 may be spring-loaded, more of the spring-force will be transferred to pushing the valve 10 shut rather than pushing the weight of the valve 10 toward the seat 11; and the disclosed check valve 10 may have tighter tolerances than molded parts, which may act to increase the integrity of the sealing surface (e.g. between seat/seating surface 11 and disc bottom surface 15) of the disc 12. Additionally, the facesheets 22 and interior core 26 remain PCD and/or PDC drillable. The sandwich composite material 20 is also relatively lightweight and of lower density than molded/infused composite densities for conventional check/float valves. Moreover, the sandwich composite material 20 is highly tailorable—the materials, manufacturing process, and layup sequences allow for control of mechanical, thermal, chemical, and dielectrical properties particular to the environment for which the check valve 10 is used in.

The manufacture methods of a sandwich composite material 20 may also vary from simple (e.g. vacuum bagging) to advanced (e.g. autoclave) manufacturing techniques. For example, the facesheets 22 may be manufactured prior to or in conjunction with adhesion, or co-cured to the core 26. Adhesion of pre-fabricated facesheets 22 to the core material 26 may be achieved by compression molding, vacuum bag curing, or autoclave curing. The facesheets 22 may be manufactured via known methods such as: wet-layup, infusion, Vacuum Assisted Resin Transfer Molding (VARTM), Resin Transfer Molding (RTM), Seemann Composite Resin Infusion Molding Process (SCRIMP), autoclave curing, or compression molding. Other components of the oilfield check valve 10 (such as the hinge 16 or body 14 of the disc 12) may be manufactured in planar, contoured, tubular, cylindrical, or rod geometries of a sandwich composite material 20 using similar manufacturing techniques. The assemblies of multiple sandwich panels 20 will require an adhesive layer 24 and a molding process including pressure and/or heat. Rod geometries may also be manufactured via filament winding where a foam structure acts as the mandrel.

In addition, an embedded component 50 (seen in FIG. 2), may be integrated into the facesheet 22 or core 26 of the composite sandwich material 20 of disc 12. By way of example only, an embedded component 50 may be an RFID tag which could be used to exploit the composite sandwich material's 20 radiolucency. Alternatively or additionally, the embedded component 50 may be or also include, by way of example only, a piezoelectric sensor, a thermocouple, or a conductive network (which may be tailored for pressure measurement, temperature measurement, and/or structural-health monitoring, respectively).

While the exemplary embodiments are described with reference to various implementations and exploitations, it will be understood that these exemplary embodiments are illustrative and that the scope of the inventive subject matter is not limited to them. By way of example only, it is to be appreciated that composite sandwich panel 20 embodiments may be used in a range of geometries including tubular, rod, planar, or contoured geometries and further, may be used in a variety of exemplary embodiments in oilfield applications such as, logging tools, baffle plates, rigid centralizers and/or shifting sleeves. In tubular geometries, the facesheets 22 may form the external and internal circumference or perimeter of the tube; in rod geometries, there may be a single facesheet 22 forming the exterior surface of the rod. The check valve 10 may also be used in a variety of different industries outside of oilfield applications, including by way of example only, mining, food and beverage, HVAC, etc. applications. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An oilfield valve having a body defining a throughbore and configured for controlling flow through the throughbore, comprising:
    a disc connected to the body and movable between an open position and a closed position, wherein the disc has a top surface and a bottom surface and defines a perimeter, and further wherein the disc is composed of a composite material;
    wherein the composite material comprises a facesheet and a core material adjacent to the facesheet; and
    wherein the facesheet comprises a matrix phase and a reinforcement phase.

2. The valve according to claim 1, wherein the facesheet comprises a top facesheet forming the top surface of the disc; and
    a bottom facesheet forming the bottom surface of the disc.

3. The valve according to claim 2, wherein the core material is located between the top facesheet and the bottom facesheet and wherein the core material is adhered to the top facesheet and the bottom facesheet with a layer of adhesive.

4. The valve according to claim 1, wherein the bottom surface and the perimeter of the disc is covered in a coating.

5. The valve according to claim 4, wherein the coating is selected from the group consisting of an elastomeric, a plastic, and a composite material.

6. The valve according to claim 1, wherein the body has a seating surface adjacent to the disc when the disc is in the closed position.

7. The valve according to claim 6, wherein the seating surface houses a seal configured for sealing against the disc in the closed position.

8. The valve according to claim 1, wherein the matrix phase comprises a thermoplastic material.

9. The valve according to claim 8, wherein the thermoplastic material is selected from the group consisting of PEEK, PTFE, PEK, PEKK, HDPE, PEI, nylon, polypropylene, LDPE, polycarbonate, PVC and ABS.

10. The valve according to claim 1, wherein the matrix phase comprises a thermoset material.

11. The valve according to claim 10, wherein the thermoset material is selected from the group consisting of epoxy, vinylester, polyester, phenolic, polyamide, bismaleimide, polyurethane, polyimide, cyanate ester and polyamidimide.

12. The valve according to claim 1, wherein the reinforcement phase comprises fibers.

13. The valve according to claim 12, wherein the type of fibers are selected from the group consisting of ceramic, metal, carbon, aramid and synthetic fibers.

14. The valve according to claim 1, wherein the core material comprises a foam.

15. The valve according to claim 14, wherein the foam is selected from a group consisting of polyvinylchloride, polyurethane, polyethylene, polystyrene, syntactic foams, wood; and aramids.

16. The valve according to claim 1, wherein the core material is selected from a group consisting of metal, ceramic, natural polymer, synthetic polymer, fibers, plastic and elastomer.

17. The valve according to claim 1, wherein the core material has a honeycomb shaped structure.

18. The valve according to claim 1, wherein the core material further comprises fibers.

19. The valve according to claim 1, wherein the body of the oilfield valve comprises a second composite material.

20. The valve according to claim 1, wherein the top surface of the disc is covered in a coating.

21. The valve according to claim 20, wherein the coating is selected from the group consisting of an elastomeric, a plastic and a composite material.

22. A method of making a disc for an oilfield valve, comprising the steps of:
- adhering a top facesheet to a surface of a core material, wherein the top facesheet defines a top surface of the disc;
- adhering a bottom facesheet to a second surface of the core material, wherein the bottom facesheet defines the bottom surface of the disc; and
- constructing each of the top facesheet and the bottom facesheet with a matrix phase and a reinforcement phase.

23. The method according to claim 22, further comprising the step of covering a bottom surface of the disc with an elastomeric coating.

24. The method according to claim 22, further comprising the step of reinforcing the core material with fibers.

25. The method according to claim 22, further comprising the step of embedding an RFID tag within the disc.

26. The method according to claim 22, wherein the steps of adhering the top facesheet to the core material, and adhering the bottom facesheet to the core material comprises the step of curing the top facesheet and the bottom facesheet simultaneously with the core material.

\* \* \* \* \*